United States Patent [19]

Mifune et al.

[11] Patent Number: 4,878,249
[45] Date of Patent: Oct. 31, 1989

[54] PATTERN RECOGNIZING DEVICE

[75] Inventors: Toshimi Mifune; Yasuo Morooka; Hiroshi Shojima; Junko Mori; Yasushi Fukunaga, all of Hitachi, Japan

[73] Assignee: Hitachi, Ltd., Tokyo, Japan

[21] Appl. No.: 101,124

[22] Filed: Sep. 25, 1987

[30] Foreign Application Priority Data

Sep. 26, 1986 [JP] Japan ................................ 61-228829

[51] Int. Cl.⁴ .............................................. G06K 9/00
[52] U.S. Cl. ......................................... 382/13; 382/21
[58] Field of Search ......................... 382/3, 13, 21-24

[56] References Cited

U.S. PATENT DOCUMENTS

| 4,024,500 | 5/1977 | Herbst et al. | 382/13 |
| 4,365,235 | 12/1982 | Greanias et al. | 382/13 |
| 4,542,412 | 9/1985 | Fuse et al. | 382/13 |
| 4,561,105 | 12/1988 | Crane et al. | 382/13 |
| 4,718,102 | 1/1988 | Crane et al. | 382/13 |

Primary Examiner—Leo H. Boudreau
Assistant Examiner—Jose L. Couso
Attorney, Agent, or Firm—Antonelli, Terry & Wands

[57] ABSTRACT

A pattern recognizing device is disclosed, in which the pattern recognition is effected by classifying all the parts of a stroke of an inputted pattern into three groups, those which are clearly arcs, those being clearly segments of line and those which are ambiguous, for which it is not possible to determine whether they are arcs or segments of line; forming a plurality of patterns of stroke structure, each of which is represented by data of a series of elements, which are arcs or segments of line, i.e. by a pattern consisting of those elements for each of the cases where it is supposed that each of the ambiguous parts is an arc or a segment of line, without interpreting it to be an arc or a segment of line; comparing each of the patterns of stroke structure thus obtained with a pluarlity of thesaurus patterns of stroke structure previously registered in a memory; checking the similarity of the structure or the similarity of every smoothly curved or straight part; and selecting a registered pattern having the greatest similarity.

18 Claims, 8 Drawing Sheets

FIG. 2
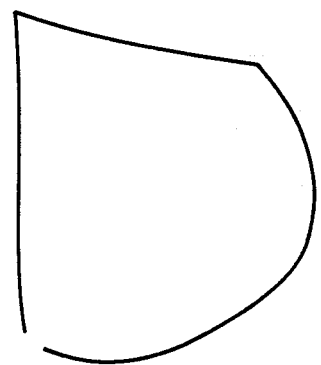
FIG. 3
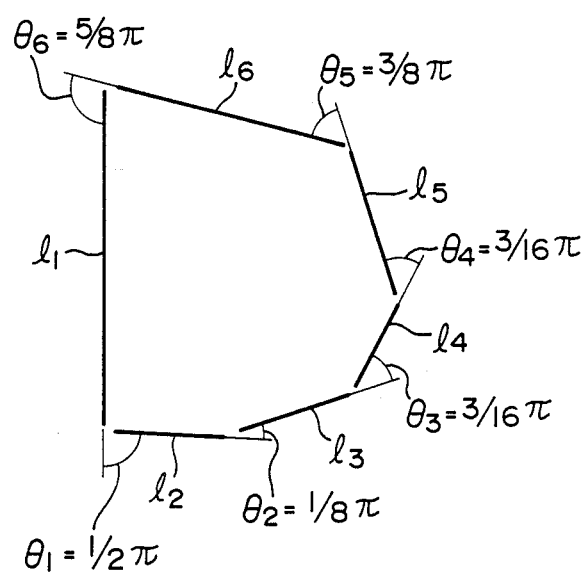
FIG. 5
| i | R(i) |
|---|------|
| 1 | SEGMENT OF LINE |
| 2 | ARC |
| 3 | ARC |
| 4 | ARC |
| 5 | AMBIGUOUS |
| 6 | SEGMENT OF LINE |
WHERE $\theta_L : 1/4\pi$
$\theta_H : 1/2\pi$

CODE DIFFERENCE BETWEEN ELEMENTS

FIG. 10a
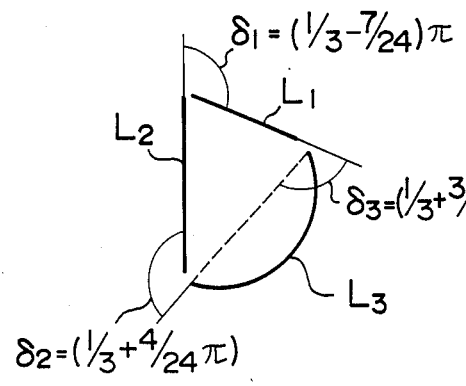
FIG. 10b
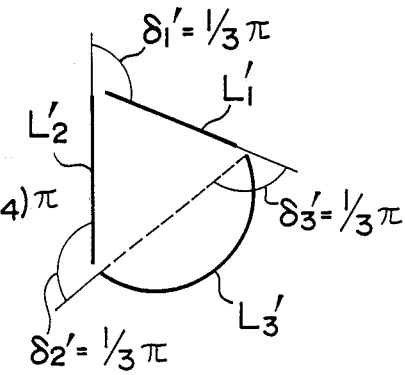
FIG. 11a
| K | Mδ(K) | Mc(K) |
|---|---|---|
| 1 | 0.3 | 1.0 |
| 2 | 0.6 | 1.0 |
| 3 | 0.7 | 1.0 |
| M₁ (SECTOR) | | 0.3 |
FIG. 11b
| K | Mδ(K) | Mc(K) |
|---|---|---|
| 1 | 1.0 | 1.0 |
| 2 | 1.0 | 0.5 |
| M₂ (SEMICIRCLE) | | 0.5 |

F I G. 12
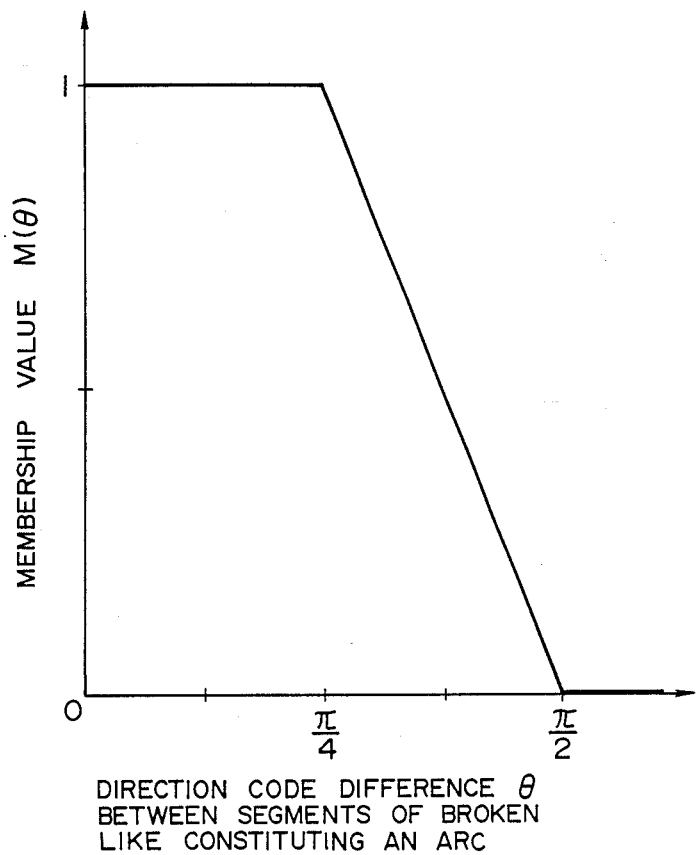

PATTERN RECOGNIZING DEVICE

BACKGROUND OF THE INVENTION

This invention relates to a pattern recognizing device, and in particular to a pattern recognizing device according to the line segment method suitable for a device for recognizing letters or patterns written by hand.

For example JP-A-60-136896 can be referred to as a publication disclosing conventional pattern recognizing devices.

According to prior art techniques, an inputted stroke of a pattern written by hand on a tablette is represented by a series of coordinate points by reading-in a coordinate point for every unit time. A segment of line is set for every time the area of a region enclosed by successively a curve formed by connecting these coordinate points and a straight line, connecting a certain coordinate point serving as the origin with an arbitrary coordinate point succeeding it, exceeds a predetermined value, so as to obtain broken line approximation data for a read-in pattern. Then it is judged whether two segments adjacent to each other are connected with an arc or they are two segments of line butted against each other with a certain angle. According to the result of this judgement the segments of line are treated as an element which is an arc when they are judged as an arc and as two elements of a broken line when they are judged as two segments of line butted against each other. In this way the read-in pattern is transformed into a series of elements, each of which is an arc or a segment of line. The pattern recognition can be effected by reading out a registered pattern which matches well, while comparing the data represented by this series of elements with a plurality of registered patterns previously defined.

However, according to these prior art techniques, it happens that characteristic values of arcs or broken lines depart from a region set for the judgement of whether the elements constitute an arc or a broken line. As a result there is a problem that the read-in pattern is transformed into erroneous data represented by a series of elements, which makes it impossible to correctly match the data with any of the registered patterns. This leads to erroneous pattern recognition.

SUMMARY OF THE INVENTION

The object of this invention is to provide a pattern recognizing device which permits read-in patterns to be correctly matched registered patterns with a higher precision, even if there are ambiguous parts in an inputted pattern, for which it is not possible to determine whether they are arcs or segments of line.

According to this invention the pattern recognition is effected by classifying all the parts of a stroke of an inputted pattern into three groups, those being clearly arcs, those being clearly segments of line and those being ambiguous, for which it is not possible to determine whether they are arcs or segments of line; forming a plurality of patterns of stroke structure, each of which is represented by data of a series of elements, which are arcs or segments of line, i.e. by a pattern consisting of those elements for each of the cases where it is supposed that each of the ambiguous parts is an arc or a segment of line, without interpreting it to be an arc or a segment of line; comparing each of the patterns of stroke structure thus obtained with a plurality of thesaurus patterns of stroke structure previously registered in a memory; checking the similarity of the structure or the similarity of every smoothly curved or straight part; and selecting a registered pattern having the greatest similarity.

Therefore, according to this invention, even if there are ambiguous parts, for which it is not possible to determine whether they are arcs or segments of line, it is possible to obtain a pattern of stroke structure both for the case where it is supposed that each of them is an arc and for the case where it is supposed that it is a segment of line and thus it is always possible to match correctly any inputted pattern with one of the thesaurus patterns. The pattern recognition is effected by checking the likelihood of each of the elements of the inputted pattern to be an arc or to be a segment of line, representing it by a similarity; and selecting one of the registered patterns, which has a greatest similarity, while recognizing ambiguities in the inputted pattern.

BRIEF DESCRIPTION OF THE DRAWINGS

FIG. 2 is a scheme for explaining an example of the inputted pattern;

FIG. 3 is an explanation scheme illustrating the result of the broken line approximation of the inputted pattern indicated in FIG. 2;

FIG. 5 is a scheme indicating the result obtained by judgement according to the flow chart indicated in FIG. 4 about the relation between two segments adjacent to each other in FIG. 3;

FIGS. 10a and 10b are schemes for explaining the matching between an inputted pattern of stroke structure and a registered pattern of sector-shaped stroke structure;

FIGS. 11a and 11b show membership values concerning the patterns of stroke structure indicated in FIGS. 7a and 7b, respectively; and FIG. 12 is a graph for obtaining membership values concerning the kind of the elements.

DESCRIPTION OF THE PREFERRED EMBODIMENTS

An embodiment of the device recognizing on-line a pattern of stroke structure written by hand will be explained below, referring to FIGS. 1 to 12.

Figure 1:
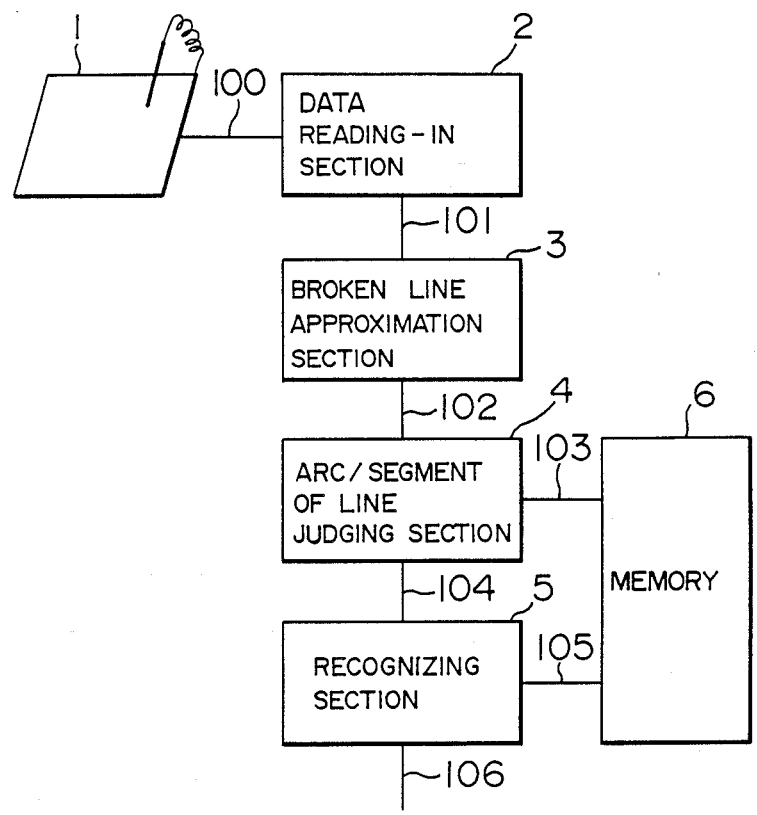
FIG. 1 is a system construction scheme illustrating an embodiment of the whole construction of a pattern recognizing device according to this invention.

In FIG. 1 stroke data sent from a tablette 1 through a signal line 100, e.g. stroke data representing a pattern of stroke structure written by hand as indicated in FIG. 2, are read-in by a data reading-in section 2 in the form of a series of coordinate points observed for every unit time and outputted in a signal line 101. These data represented by a series of coordinate points are transformed into broken line approximation data, as indicated in FIG. 3, by a broken line approximation section 3 and outputted in a signal line 102. The techniques to this point are disclosed in JP-A-60-136892.

An arc/segment of line judging section 4 outputs a series of segments of line labeled with three states, i.e. arc, segment of line, and ambiguous part, for which it is not possible to determine whether it is an arc or a segment of line, depending on the difference between directions of two segments of line adjacent to each other in the broken line approximation data according to the definition of the arc and the segment of line received from a memory 6 through a signal line 103. A recognizing section 5 transforms the series of labeled segments of line into a series of elements, which are arcs or segments of line. However no judgement as to whether they are arcs or segments of line is joined to the parts, which are judged by the arc/segment of line judging section 4 to be ambiguous, but a plurality of patterns of stroke structure are formed by making a plurality of data represented by a series of elements separately for the case where they are arcs and for the case where they are segments of line. Each of these patterns of stroke structure is compared with one or more similar patterns of stroke structure in the thesaurus of registered patterns read-out from the memory 6 through a signal line 105 and a membership value representing the similarity is obtained. The pattern giving the highest membership value in the thesaurus is outputted in a signal line 106 as the recognition result.

The arc/segment of line judging section 4 and the recognizing section 5 in FIG. 1 will be explained below more in detail.

Figure 4:
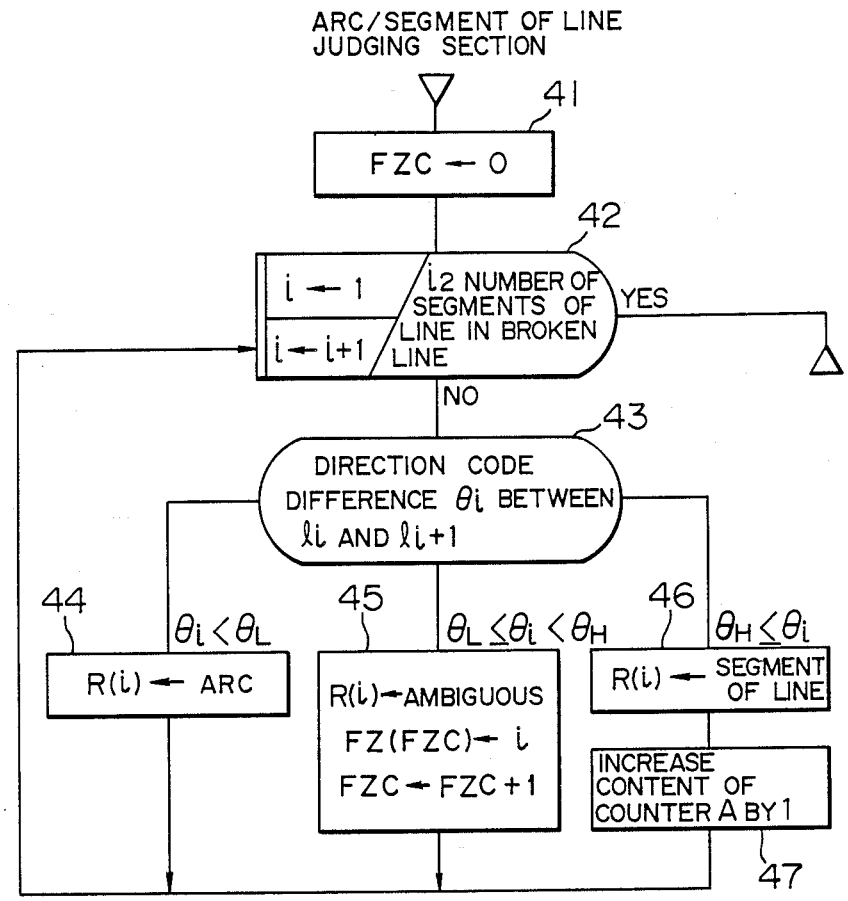
FIG. 4 is a flow chart for explaining the operation of a principal part of the device indicated in FIG. 1.

FIG. 4 shows the treatment flow for the arc/segment of line judging section 4 in FIG. 1 in detail, which treats successively the broken line data $l_1, l_2, \text{-----}$ indicated in FIG. 3 for every two segments of line $l_i$ and $l_{i+1}$ adjacent to each other. In the figure, in Step 41, the counter FZC counting the number of ambiguous parts is reset. In Step 42, the broken line counter i is set to 1 and it is judged whether the count number of the broken line counter i is equal to the number of segments of line constituting a broken line or not. During a period of time where it is judged to be NO, a treatment described below is repeated.

When it is judged in Step 42 to be NO, in Step 43, the difference between the directions of two segments of line $l_i$ and $l_{i+1}$ in the broken line, i.e. the direction code difference. $\theta_i$ is calculated and compared with threshold values $\theta_L$ and $\theta_H$ ($\theta_L \leq \theta_H$) received from the memory 6. In an embodiment $\theta_L = \pi/4$ and $\theta_H = \pi/2$. When judged $\theta_i < \pi_L$ in Step 43, the direction code difference between the relevant segments of line is small. Consequently it is judged that the two segments of line $l_i$ and $l_{i+1}$ are continuous so that they form a smooth curve and "arc" is set in the intersegment relation memory R(i) storing the arc/segment of line relation between the two adjacent segments of line $l_i$ and $l_{i+1}$. On the contrary, when judged $\theta_H \leq \theta_i$ in Step 43, the direction code difference between the relevant segments of line is great. Consequently it is judged that the two segments of line $l_i$ and $l_{i+1}$ do not form a smooth curve, but they are discontinuously butted against each other. Then "segment of line" is set in the intersegment relation memory R(i) and in Step 47 the content in the broken line counter A counting the number of judgements that they form a broken line is increased by 1.

When judged $\theta_L \leq \theta_i < \theta_H$ in Step 43, it is judged that it is ambiguous whether they form an arc or a broken line and "ambiguous" is set in the intersegment relation memory R(i). At the same time the number of the ambiguous part represented by the number of segment i at the ambiguous part is stored in the ambiguous part number memory FZ and the content of the counter FZC counting the number of ambiguous parts is increased by 1. After that, the process returning again to Step 42, the content in the broken line counter i is increased by 1 and it is judged whether the counting value has reached the number of segments of the relevant broken line. Here, when judged YES, the flow is terminated.

In the case where a plurality of successive segments are judged to be arcs, these segments are considered to be an element in the form of an arc. However, a plurality of segments constituting an element, which is a series of arcs, are used for calculating the membership value, as stated later. On the other hand, when judged a segment of line in Step 46, since the segment of line constitutes an element, as it is, the content in the counter A is increased by 1 in Step 47. Consequently the counter A is a counter for counting the number of elements.

FIG. 5 is a scheme indicating the result obtained by judgement according to the flow chart indicated in FIG. 4 about the series of segments in FIG. 3. That is, since $\theta_1$ and $\theta_6$ are equal to or greater than $\theta_H = \pi/2$, the elements are judged to be "segments of line". On the contrary, since $\theta_2$, $\theta_3$ and $\theta_4$ are smaller than $\theta_L = \pi/4$, the elements are judged to be "arcs", and since $\theta_5$ is comprised between $\pi/4$ and $\pi/2$, the element is judged to be "ambiguous".

Next, the recognizing section 5 will be explained more in detail, referring to FIG. 6. In the figure, in Step 61, the memory storing the membership value, the counter, etc. is reset. In Step 62, the structure pattern counter FLG counting the number of the pattern of stroke structure is set to 0. Since the patterns of stroke structure are formed separately for the case where it is supposed that the ambiguous part is an arc and for the case where it is supposed that the ambiguous part is a segment of line, the number of the patterns of stroke structure, which should be formed, is $2^{FZC}$, where FZC is the number of the ambiguous parts. In Step 62, the processes in Step 63 and the following steps are controlled so as to be repeated for every pattern of stroke structure. Consequently, in the structure pattern counter FLG the number of bits used is equal to the number of the ambiguous parts. For example, when there are two ambiguous parts, the two least significant bits of the counter FLG is used, the first bit being applied for one of the ambiguous parts, the second bit being applied for the other. Further, a pattern of stroke structure is formed by considering the element to be an arc, when the state of each of the bits is "1", and to be a segment of line, when the state of each of the bits is "0".

Figure 7A:
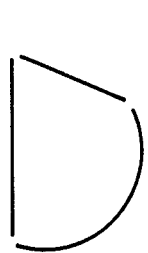
FIGS. 7a and 7b show two patterns of stroke construction formed on the basis of the ambiguities in the inputted pattern represented by the broken line approximation in FIG. 3.
Figure 7B:
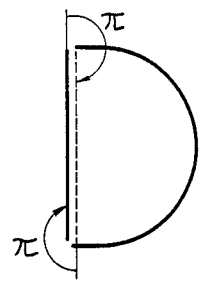
Figure 9:
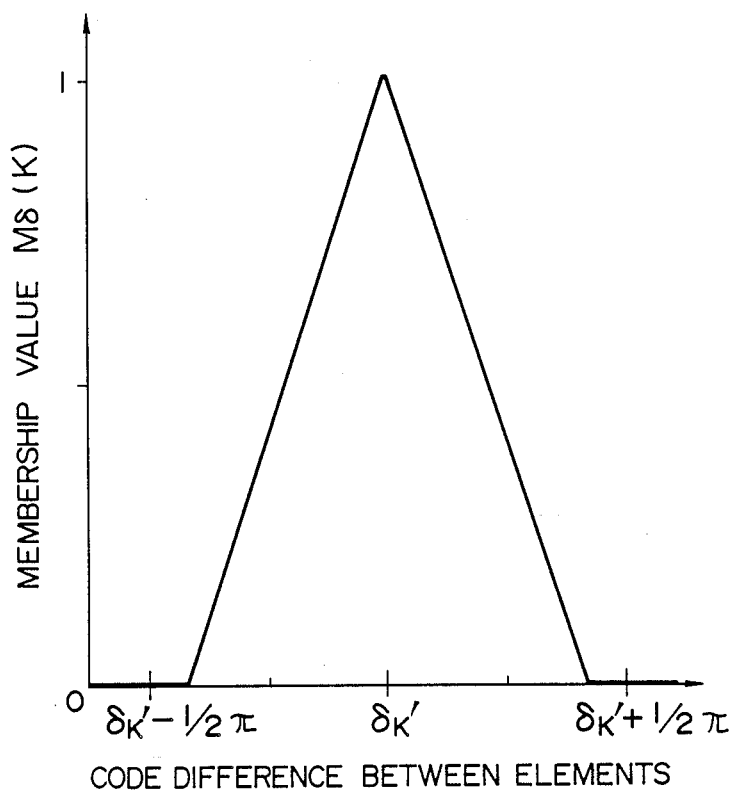
FIG. 9 is a graph for obtaining membership values representing the direction code difference.

In Step 63 the bit counter j assigning the position of each of the bits in the structure pattern counter FLG is set to 1, which assigns the first bit. In Step 64 it is judged whether the state of the assigned bit in the bit assigning counter j is "1". When judged here YES, it is supposed that the element is an arc, and in Step 65 the arc is registered in the intersegment relation memory R(FZ(j)) of the ambiguous part corresponding to the bit assigned by the bit assigning counter j. On the contrary, when judged NO in Step 64, a segment of line is registered, in Step 66, in the intersegment relation memory R(FZ(j)), and the content of the counter B is increased by 1. This counter B is a counter counting the number of the elements, which are segments of line for the same reason as the counter A in Step 47. For example, in the example indicated in FIG. 3, since $\theta_5$ is judged to be ambiguous, when the ambiguous part is considered to be a segment of line, a pattern of stroke structure indicated in FIG. 7a is obtained and when it is considered to be an arc, that indicated in FIG. 7b is obtained. When these Steps are terminated, the process returns again to Step 63 and in order to treat the state of the following bit in the structure pattern counter, one count is given to the bit assigning counter j and it is judged whether the result thus obtained has become equal to the number of the ambiguous parts FZC. When judged here to be NO, the processes in Step 64 and the followings are repeated. On the contrary, when judged to be YES, since all the ambiguous parts are supposed to be arcs or segments of line, in Step 68 a series of elements, whose end is a part where a segment of line is butted against another, is formed.

For the series of elements formed in Step 68 the registered pattern of stroke structure, which is the most similar to the relevant pattern of stroke structure, is searched in Step 69, which will be described in detail later, and a matching process is carried out for calculating a membership value representing the similarity. Then, the process returning to Step 62, one count is given to the structure pattern counter FLG; the succeeding pattern of stroke structure is assigned; and it is judged whether the count value has reached $2^{FZC}$. When judged here NO, the processes in Step 63 and the followings are repeated. On the contrary, when judged YES, since the registered pattern having the greatest membership value has been searched for each of the patterns of stroke structure, in Step 70 the registered pattern having the greatest membership value among these patterns of stroke structure is selected and recognized as the inputted pattern of stroke structure.

Figure 6:
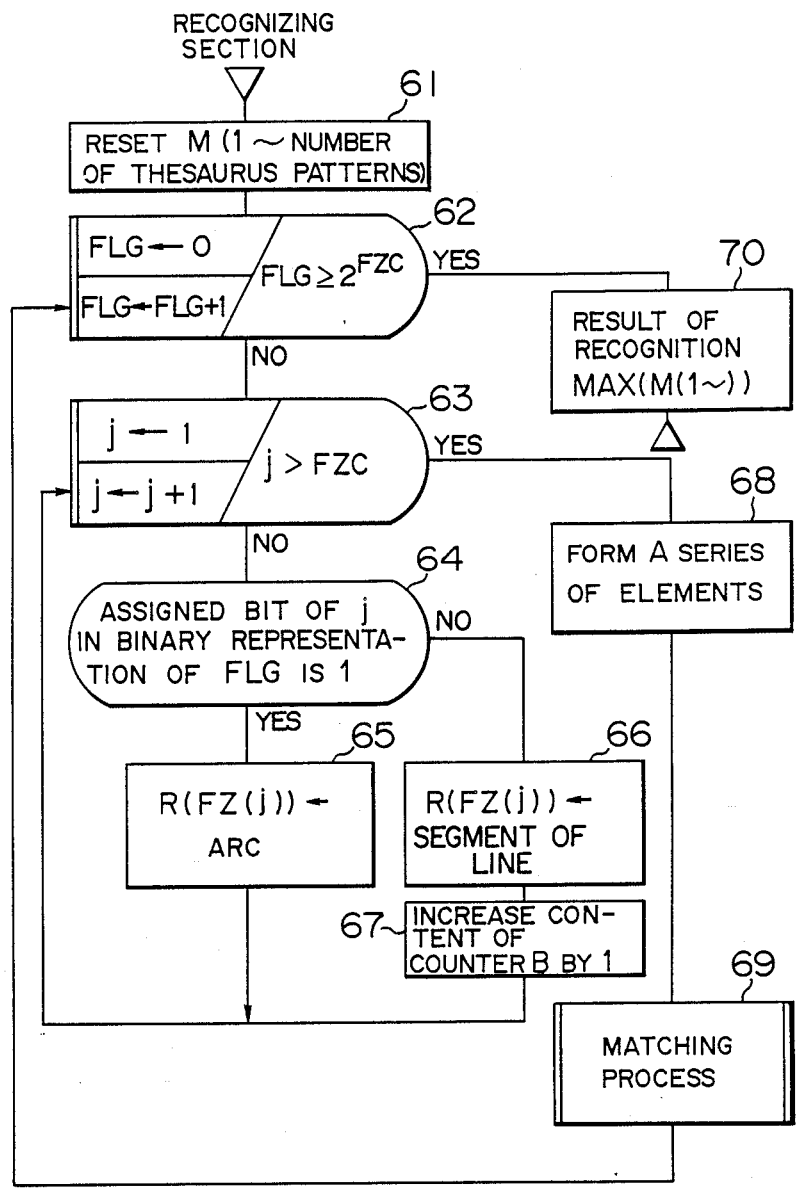
FIG. 6 is a flow chart for explaining the operation of another principal part of the device indicated in FIG. 1.
Figure 8:
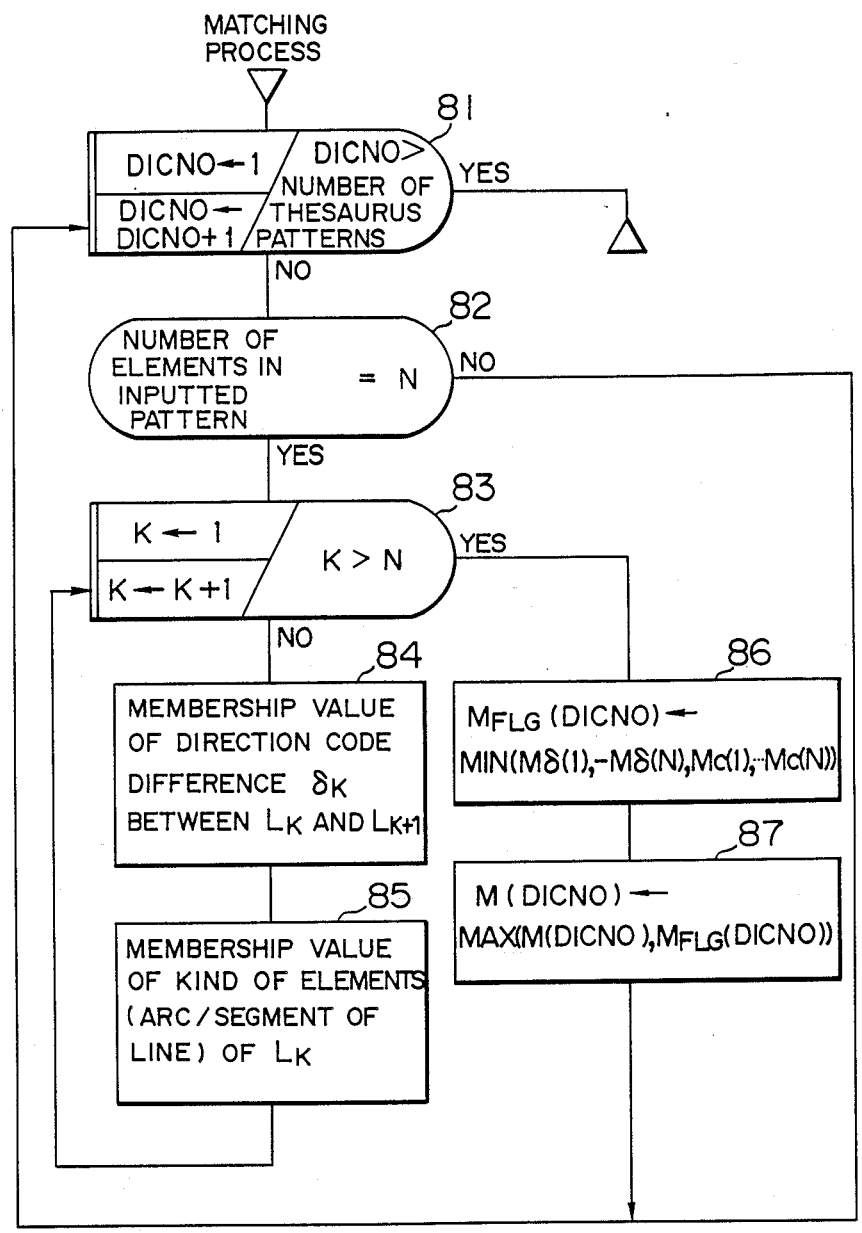
FIG. 8 is a more detailed flow chart of the principal part indicated in FIG. 6.

FIG. 8 shows Step 69 in FIG. 6 in detail.

In FIG. 8, in Step 81, the counter DICNO assigning the register number of the thesaurus patterns registered in the thesaurus is set to 1 and it is judged whether the count value has become greater than the number of all the thesaurus patterns. In this case, since the process is still at the beginning step and therefore the result of the judgement is NO, the process proceeds to the succeeding Step 82. The number of the series of elements in the inputted pattern formed in Step 68 in FIG. 6 is the sum of the count value of the counter A in Step 47 in FIG. 4 and the count value of the counter B in Step 67 in FIG. 6. In Step 82 it is checked whether the number N of the series of elements in the thesaurus pattern assigned by the register number counter DICNO is equal to that in the inputted pattern. If the numbers of the series of elements in the two patterns are different, since the thesaurus pattern differs clearly from the relevant pattern of stroke structure, it is judged here to be NO. On the contrary if the numbers of the series of elements in the two patterns are equal, it is judged to be YES and the process proceeds to Step 83. In Step 83, at first, the element counter K is set to 1 and then it is checked whether the content of the counter K is greater than the number N of the elements of the thesaurus pattern. When judged here to be NO, in Step 84, the direction code difference $\delta_K$ between two segments of line $L_K$ and $L_{K+1}$ adjacent to each other is compared with the corresponding direction code difference in the thesaurus pattern and the membership value $M\delta(K)$ relating to the direction code difference is obtained according to the function indicated in FIG. 9. This principle will be explained below, while comparing the pattern of stroke structure indicated in FIG. 10a with that of the thesaurus pattern indicated in FIG. 10b. For the direction code difference $\delta 1$, since there is a difference of $-7\pi/24$ between $\delta 1$ and $\delta 1'$, referring to FIG. 9, the membership value $M\delta(1)$ is about 0.3, as indicated in FIG. 11a. Every time when judged NO in Step 83, in the similar way, for $\delta 2$ and $\delta 3$ $M\delta(2)$ is about 0.6 and $M\delta(3)$ is about 0.7. Further, for the elements $L_3$ and $L_3'$, which are arcs, as indicated by dashed lines in FIGS. 10a and 10b, the direction code difference is calculated between the straight line connecting the two ends of the element and the segment of line adjacent thereto.

In Step 85 the membership values $M_c(K)$ are obtained, based on the kind of the element representing whether the element $L_K$ is a segment of line or a curve. When the relevant element $L_K$ of the thesaurus pattern is an arc, for the segments of line $l_1$ to $l_j$ of a broken line constituting the element $L_K$ the membership value representing the likelihood to be an arc is obtained on the basis of the direction code differences $\theta_i$ to $\theta_j$ between segments of a broken line, referring to the function indicated in FIG. 12. For example, the example illustrated in FIG. 3 will be explained as follows. Since the elements $l_2$ to $l_5$ are judged to be a series of arcs, the FIG. 12 is referred to for $\theta_2$, $\theta_3$ and $\theta_4$. Since all of these direction code differences are smaller than $\pi/4$, all of the membership value $M(\theta)$ are 1.0. The membership value $M_c(K)$ relating to the kind of the element is the smallest among them, i.e. in this case 1.0. Further, when the relevant element of the thesaurus pattern is a segment of line, it is supposed that the membership value $M_c(K)$ is 1.0. In the example indicated in FIG. 10, since the elements $L_1$ and $L_2$ are segments of line; thus their membership values $M_c(1)$ and $M_c(2)$ are 1.0 and the membership value $M_c(3)$ of the arc $L_3$ is 1.0, as stated previously, the membership value for each of the elements is as indicated in FIG. 11a.

After the process in Step 85 has been terminated, it returns to Step 83 and one count is given to the element counter K. Then it is judged whether the count value has become greater than the number of the elements. When judged here NO, the processes in Steps 84 and 85 are repeated in the same way as described above. On the contrary, when judged YES, it means that the membership values have been obtained for all the elements and the process proceeds to Step 86.

In Step 86 the smaller one between the membership value $M\delta(K)$ relating to the direction code difference and the membership value $M_c(K)$ relating to the kind of the element is selected as the membership value $M_{FLG}(DICNO)$ for the thesaurus patterns. This is the membership value for a given pattern of stroke structure. In the example indicated in FIG. 11a, 0.3 is selected as the minimum value. Furthermore this membership value $M_{FLG}(DICNO)$ may take the maximum value, the average value, the total sum or the product thereof instead of the minimum value.

In Step 87 the membership value obtained in Step 86 of the preceding process is compared with the membership value obtained in Step 86 of this process, in order to take the greater one therebetween, and the process returns to Step 81. Consequently, in Step 87, the greatest among the membership values is always selected. In Step 81 one count is given to the register number counter DICNO and it is judged whether the count value has become greater than the number of the thesaurus patterns. When judged here No, since it means that there remain thesaurus patterns, which are not yet checked, the processes in Step 83 and the following steps are carried out in the same way as described above. On the contrary, when judged YES, it means that all the thesaurus patterns have been checked, and the flow is terminated.

FIG. 11b shows the membership value, in the case where the pattern of stroke structure is a semicircle, as indicated in FIG. 7b. That is, in the case where the element is an arc, for the membership value $M\delta(K)$ relating to the direction code difference, since the direction code difference is obtained on the basis of a straight line connecting the two ends of the semi-circle (indicated in a dashed line in FIG. 7b), the direction code difference at the two parts where the semi-circle and the straight line intersect with each other are $\pi$. They are $\pi$ for the thesaurus pattern, too. Consequently, since the direction code differences between two elements adjacent to each other are equal for the two patterns, both the membership values $M\delta(K)$ are 1.0, as indicated in FIG. 11b, referring to FIG. 9. Further, since the element $L_1$ is a segment of line, the membership value $M_c(K)$ relating to the kind of the element is 1.0. On the other hand, since the element $L_2$ is an arc, examining $\theta_2$ to $\theta_5$ in FIG. 3, 1.0 is obtained for $\theta_1$ to $\theta_4$, as stated previously, and 0.5 can be obtained for $\theta_5$, referring to FIG. 12. In this example, in Step 86, 0.5 is selected as the membership value $M_{FLG}(DICNO)$.

We claim:

1. A pattern recognizing device comprising:
   means for forming a structure pattern represented by date of a series of segments, based on a 2-dimensional pattern drawn with a single stroke, wherein said structure pattern forming means includes:
   (1) means for detecting segments where the relation between two segments adjacent to each other is ambiguous so that it is not possible to determine whether they form an arc or a segment of line, and
   (2) means for forming a plurality of patterns, each of which is comprised of data of a series of segments, both for the case where it is supposed that an ambiguous segment is an arc and for the case where it is supposed that an ambiguous segment is a segment of line, when at least one ambiguous segment is detected by said detecting means;
   means for storing a plurality of thesaurus structure patterns defined by data of a series of elements, each of which is at least one of an arc and a segment of line; and
   means for selecting one of said thesaurus structure patterns having the greatest similarity with a pattern obtained by said structure pattern forming a means, wherein said means for selecting includes:
   (1) first selecting means for selecting a corresponding most similar one of said thesaurus structure patterns for each of said plurality of patterns obtained by said means for forming a plurality of patterns, and
   (2) recognizing means for determining which one of said most similar thesaurus structure patterns and corresponding one of said plurality of patterns have the greatest similarity.

2. A pattern recognizing device according to claim 1, wherein said means for forming a plurality of patterns includes a counter consisting of a number of binary bits, which is equal to the number of ambiguous segments detected by said detecting means, disposed corresponding to each of the ambiguous segments, means for increasing the content of said counter by 1 every time said data of series of segments is formed by said means for forming a plurality of patterns, means for assigning successively said bits, and means for setting an arc or a segment of line at each of said ambiguous segments according to the state of said bits assigned by said means for assigning successively said bits.

3. A pattern recognizing device according to claim 1, wherein said first selecting means comprises means for comparing said data of a series of segments obtained by said means for forming a plurality of patterns with said data of a series of elements in each of said thesaurus structure patterns and calculating the similarity therebetween and means for selecting one of said thesaurus structure patterns having the greatest value obtained by said comparing and calculating means.

4. A pattern recognizing device according to claim 3, wherein said comparing and calculating means includes means for obtaining the similarity on the basis of a variation in the direction of the segments constituting said data of a series of segments.

5. A pattern recognizing device according to claim 4, wherein said comparing and calculating means includes means for obtaining the similarity on the basis of predetermined functions according to the difference between the variation in the direction of the segments in said structure pattern and that in said thesaurus pattern.

6. A pattern recognizing device according to claim 3, wherein said comparing and calculating means includes means for obtaining the similarity on the basis of the kind of said data of a series of segments.

7. A pattern recognizing device according to claim 3, wherein said comparing and calculating means includes first means for obtaining a plurality of similarities for every segment which is comprised of data of a series of segments and second means for obtaining a similarity of the relevant data of a series of segments from said plurality of similarities obtained by said first means.

8. A pattern recognizing device according to claim 7, wherein said second means selects the greatest similarity among said plurality of similarities obtained by said first means.

9. A pattern recognizing device according to claim 7, wherein said means second selects the maximum value among said plurality of similarities obtained by said first means.

10. A pattern recognizing device according to claim 7, wherein said second means makes an average value of said plurality of similarities obtained by said first means.

11. A pattern recognizing device according to claim 7, wherein said second means makes a total sum of said plurality of similarities obtained by said first means.

12. A pattern recognizing device according to claim 7, wherein said second means makes a product of said plurality of similarities obtained by said first means.

13. A pattern recognizing device comprising:
   means for forming a structure pattern represented by data of a series of segments, each of which is one of a plurality of predetermined element types, based on an inputted pattern, wherein said structure pattern forming means includes:
   (1) means for detecting that at least one segment in said series of segments to be formed on the basis of said inputted pattern is ambiguous, and
   (2) means for forming a plurality of patterns, each of which is comprised of data of a series of segments, for all cases where it is supposed that said at least one ambiguous segment corresponds to each of said plurality of predetermined element types, when at least one ambiguous segment is detected by said detecting means;

means for storing a plurality of thesaurus structure patterns defining data of a series of elements, each of which is one of said predetermined element types; and means for selecting one of said thesaurus structure patterns having the greatest similarity with a pattern obtained by said structure pattern forming means, wherein said selecting means includes:

(1) most similar thesaurus pattern selecting means for selecting a most similar thesaurus structure pattern for each of said plurality of patterns formed by said means for forming a plurality of patterns, and (2) recognizing means for determining which of said most similar thesaurus structure patterns and said plurality of patterns formed by said means for forming a plurality of patterns have the greatest similarity.

14. A pattern recognizing device according to claim 13, wherein said means for forming a plurality of patterns includes a counter consisting of a number of binary bits, which is equal to the number of ambiguous segments detected by said detecting means, disposed corresponding to each of the ambiguous segments, means for increasing the content of said counter by 1 every time said data of a series of segments is formed by said means for forming a plurality of patterns, means for assigning successively said bits, and means for setting an arc or a segment of line at each of said ambiguous segments according to the state of said bits assigned by said means for assigning successively said bits.

15. A pattern recognizing device according to claim 13, wherein said first selecting comprises means for comparing said data of a series of segments obtained by said means for forming a plurality of patterns with said data of a series of elements in each of said thesaurus structure patterns and calculating the similarity therebetween and means for selecting one of said thesaurus structure patterns having the greatest value obtained by said comparing and calculating means.

16. A method for use in a pattern recognition device for recognizing patterns of stroke structure written by hand and inputted to said pattern recognition device, said method comprising the steps of:

forming a structure pattern with a series of segments based on a two-dimensional pattern drawn with a single stroke;

detecting when the relationship between two adjacent segments of said formed structure pattern is ambiguous so that it is not possible to determine whether they form an arc of a segment of line;

forming a plurality of patterns when at least one ambiguous relationship is detected, wherein a pattern is formed for the case where it is supposed that said two adjacent segments form an arc and for the case where it is supposed that said two adjacent segments form a segment of line;

storing a plurality of thesaurus structure patterns comprising a series of elements, wherein each of said elements is at least one of an arc and a segment of line; and selecting one of said thesaurus structure patterns which has the greatest similarity with said formed structure pattern, wherein when said at least one ambiguous relationship is detected said selecting step further comprises the steps of:

selecting a most similar thesaurus structure pattern corresponding to each of said plurality of formed patterns; and determining which of said most similar thesaurus structure patterns has the greatest similarity with the corresponding pattern of said plurality of formed patterns.

17. A method for recognizing patterns according to claim 16, wherein said step of forming a plurality of patterns further comprises the steps of:

providing a counter consisting of a plurality of binary bits, wherein the number of bits used is equal to the number of ambiguous segments detected in said detecting step;

successively assigning each of the bits in said counter to a corresponding bit in a bit assigning counter;

setting an arc or a segment of line at each of said ambiguous segments according to the state of said bits assigned to said bits in said bit assigning counter.

18. A method for recognizing patterns according to claim 17, wherein said step of selecting a most similar thesaurus structure pattern further comprises the steps of:

comparing data obtained by said means for forming a plurality of patterns with said data of a series of elements in each of said thesaurus structure patterns;

calculating the similarity between said data obtained by said means for forming a plurality of patterns and said data of a series of elements in each of said thesaurus structure patterns based upon said comparison; and selecting the one of said thesaurus structure patterns having the greatest similarity based upon said calculation.

* * * * *